Figure 1:
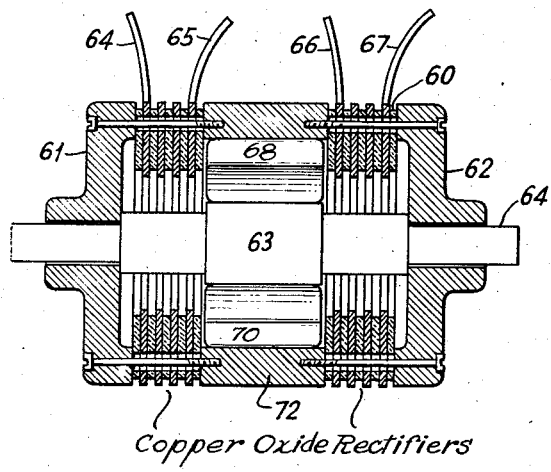

July 1, 1941.                    C. W. HANSELL                    2,247,753

AUTOMOTIVE ELECTRICAL SYSTEM

Original Filed April 14, 1934

Copper Oxide Rectifiers

INVENTOR.
CLARENCE W. HANSELL
BY
ATTORNEY.

Patented July 1, 1941

2,247,753

UNITED STATES PATENT OFFICE 2,247,753

AUTOMOTIVE ELECTRICAL SYSTEM

Clarence W. Hansell, Port Jefferson, N. Y., assignor to Radio Corporation of America, a corporation of Delaware Original application April 14, 1934, Serial No. 720,559. Divided and this application April 7, 1938, Serial No. 200,606

2 Claims. (Cl. 175—366)

This invention relates to an improved automotive electrical system and is a division of my application No. 720,559 filed April 14, 1934, now Patent No. 2,138,160, granted November 29, 1938.

An object of this invention is to simplify and improve the present type of automotive electrical system which is utilized by practically all types of mobile units, and especially to improve automotive units having contained therein radio apparatus.

A feature of this system is that it can be easily interchanged with the present electrical equipment as is used in automobiles, airplanes, motor boats, engine driven lighting plants and other like equipment.

The present day automotive electrical system includes generally a direct current generator and a storage battery. Such generators have contained within them a rotary armature having a commutator and associated brushes. Frequently trouble arises with the commutator and brushes due to wear, dust, grease and oil, causing poor contact between the commutator and the brushes which gives rise to objectionable sparking. This commutator sparking causes an interference to radio reception and results in undesirable noises at the aural end of the radio apparatus. Such commutator and brush arrangements are expensive to manufacture, as is also its associated armature which comprises a considerable number of individual coils which are difficult and expensive to insulate properly, to insure long life to the generator. Likewise, the present direct current automotive generator is bulky, heavy, and generally inefficient.

By my invention I overcome and considerably reduce most of the objectionable features inherent in the present-day generators by substituting for the direct current generator a magneto type of alternating current generator which is preferably designed to give a square wave alternating current output which I connect to a balanced bridge arrangement or push-pull copper oxide rectifier or any other type of rectifier with similar characteristics, which will deliver current to the battery. Such a system will eliminate the sparking, wear and other troubles due to commutator and brushes in the direct current generators now in use.

The magneto type of alternating current generator can easily be designed to be more efficient and simpler in construction, and more compact than the present type of generators in use. This is partly due to the fact that a magneto type of alternating current generator can be driven at a higher speed than the direct current generators as employed in automotive units. The much higher speed in the magneto type of alternating current generator is entirely practical because the armature of the magneto may be constructed entirely of iron without individual windings which restrict the speed of the generators due to centrifugal force tending to loosen the windings from the armature. The armature designed entirely of iron, with suitable slots, may be utilized for speeds as high as 3600 revolutions per minute or more. The combination of a magneto type of alternating current generator and a balanced rectifier will automatically take care of regulating or holding down the charging current of the storage battery when such a type of generator is run at the highest speeds as mentioned above. If the reactance of the generator is a large factor in determining the alternating current output, then the change in frequency from the output with an increase in speed will automatically cause the reactance to vary in a direction tending to hold a constant charging current. However, if necessary, an external reactance could be used to assist in maintaining a reasonably constant current.

My invention will best be understood by referring to the accompanying drawing, in which, Figure 1 is a sectional view of an improved combined alternating current generator and rectifier.

Figure 2:
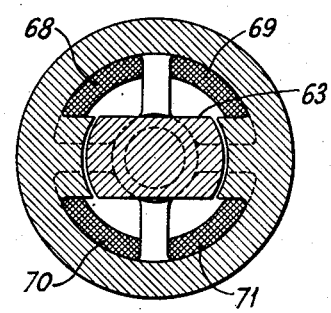

Figure 2 is a cross section of Figure 1 showing the combined alternating current generator and rectifier.

These figures show a magneto generator with a rotating permanent magnet for inducing alternating current voltages in stationary armature coils. Preferably, the permanent magnet should be copper coated so that eddy currents in the copper will tend to prevent variations in flux of the magnet and so reduce armature reaction and thus improve the voltage regulation of the generator. As shown in the drawings, the copper oxide rectifier discs are mounted in the form of washers between the main frame and the end pieces of the generator. The drawing for the purpose of illustration, shows the rectifier discs 60 much thicker than they need to be in practice. The end bells 61, 62 of the generator, serve to clamp the rectifier discs against the frame under pressure. Screws or bolts, not shown, may be used to exert the pressure. If desired, the rectifier discs may be mounted at only one end of the frame to facilitate taking the generator apart without disturbing the rectifier. An advantage of this arrangement, in addition to simplifying circuits and installation, is that the generator frame assists in conducting heat away from the rectifier. Other parts of the combined rectifier and generator are the permanent magnet rotor 63, shaft 64 and rectifier terminals 65, 66 and 67, also field coils 68, 70 and 69, 71 which are retained within the generator frame 72.

The details of construction of my invention are readily apparent from the figures so it is not believed necessary to describe them in further detail.

I claim as my invention:

1. In an automotive electrical system a hollow metallic cylindrical shell, an end bell at one end of said shell and annular rectifier discs clamped between said end bell and said cylindrical shell, the central aperture in said discs providing an air passage to the interior of said shell whereby both the interior and exterior surfaces of said cylindrical shell serve as heat radiators for said rectifier discs.

2. In combination, a metallic cylindrical shell, an end bell at each end of said shell and annular rectifier discs clamped between each of said end bells and said cylindrical shell, the central aperture in said discs providing an air passage to the interior of said shell whereby both the inner and outer surfaces of said cylindrical shell serve as heat radiators for said rectifier discs.

CLARENCE W. HANSELL.